(12) United States Patent
Martin et al.

(10) Patent No.: US 11,656,769 B2
(45) Date of Patent: May 23, 2023

(54) AUTONOMOUS DATA PROTECTION

(71) Applicant: EMC IP Holding Company LLC, Hopkinton, MA (US)

(72) Inventors: Owen Martin, Hopedale, MA (US); Jeffrey Wilson, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 16/923,376

(22) Filed: Jul. 8, 2020

(65) Prior Publication Data

US 2022/0011950 A1    Jan. 13, 2022

(51) Int. Cl.
*G06F 3/06*    (2006.01)
*G06F 21/78*    (2013.01)

(52) U.S. Cl.
CPC ............ *G06F 3/0623* (2013.01); *G06F 3/067* (2013.01); *G06F 3/0619* (2013.01); *G06F 3/0631* (2013.01); *G06F 3/0653* (2013.01); *G06F 21/78* (2013.01)

(58) Field of Classification Search
CPC ...... G06F 3/0623; G06F 3/0653; G06F 3/067; G06F 3/0631; G06F 3/0619; G06F 21/78
See application file for complete search history.

(56) References Cited

U.S. PATENT DOCUMENTS

| | | | | |
|---|---|---|---|---|
| 10,733,514 | B1* | 8/2020 | Savir | G06N 5/04 |
| 2003/0157960 | A1* | 8/2003 | Kennedy | H04M 1/72412 |
| | | | | 455/556.1 |
| 2012/0323853 | A1* | 12/2012 | Fries | G06F 11/3072 |
| | | | | 707/649 |
| 2018/0332069 | A1* | 11/2018 | Moore | G06F 21/577 |
| 2018/0336687 | A1* | 11/2018 | Mudretsov | G06V 40/25 |
| 2020/0028867 | A1* | 1/2020 | Monsen | H04L 63/1425 |
| 2020/0364128 | A1* | 11/2020 | Vittal | G06F 9/45558 |
| 2021/0044604 | A1* | 2/2021 | Annen | G06F 21/565 |
| 2021/0117377 | A1* | 4/2021 | Savir | G06F 16/128 |
| 2021/0123797 | A1* | 4/2021 | Kiesel | H01F 27/14 |

* cited by examiner

*Primary Examiner* — Hiep T Nguyen
(74) *Attorney, Agent, or Firm* — Krishnendu Gupta; Nikhil Patel

(57) ABSTRACT

Embodiments of the present disclosure relate to autonomous data protection. An input/output (I/O) stream can be received for a storage device. One or more anomalies corresponding to the I/O stream can be identified. At least one of the one or more anomalies can be offloaded anomalies to a remote storage based on a capacity of memory allocated to store at least one snapshot of the storage device that include at least one of the one or more anomalies.

20 Claims, 6 Drawing Sheets

US 11,656,769 B2

AUTONOMOUS DATA PROTECTION

BACKGROUND

A storage area network (SAN) is a dedicated high-speed network that interconnects and presents shared pools of storage devices to multiple servers. As amounts of data created and stored on a SAN grows, organizations need to be sure the data is protected. Accordingly, organizations and storage solution providers use data protection techniques to safeguard important data from corruption, compromise, or loss.

SUMMARY

One or more aspects of the present disclosure relate to autonomous data protection. Embodiments of the present disclosure relate to autonomous data protection. An input/output ("I/O" or "IO") stream can be received for a storage device. One or more anomalies corresponding to the I/O stream can be identified. At least one of the one or more anomalies can be offloaded anomalies to a remote storage based on a capacity of memory allocated to store at least one snapshot of the storage device that include at least one of the one or more anomalies.

In embodiments, the one or more snapshots of the storage device and/or at least one component of the storage device can be obtained based on one or more of a predetermined snapshot rate and a dynamically determined snapshot rate. Further, the one or more anomalies can be identified based on a change rate corresponding to the memory allocated to store data contained in one or more IO operations of the IO stream, wherein the change rate corresponds to changed tracks of each logical unit number (LUN) of the memory.

In embodiments the one or more anomalies can be offloaded to the remote storage based on at least one or more of a bandwidth to the remote storage, storage device performance state, service level priorities, and predictions of one or more anomalies being identified during a future time period.

In embodiments a bandwidth to the remote storage and/or a storage device performance state can be measured.

In embodiments, a service level (SL) tier of a service level agreement (SLA) corresponding to data contained in one or more IO operations of the IO stream can be identified. Each SL tier of the SLA can define one or more performance requirements for storing the data.

In embodiments, a bandwidth capacity for sending data to the storage device can be measured by monitoring throughput to the remote storage device.

In embodiments, a portion of the bandwidth capacity can be allocated for offloading the one or more anomalies.

In embodiments, at least one of a bandwidth consumption ceiling and/or bandwidth consumption floor to each SL tier can be dynamically assigned based on the allocated bandwidth portion.

In embodiments, an anomaly detection model can be generated based on confirmed anomaly data using an anomaly detection learning engine. A bandwidth capacity model for offloading the one or more anomalies based on the measured bandwidth capacities over time can also be generated.

In embodiments, the one or more anomalies can be offloaded based on one or more of the anomaly detection model and the bandwidth capacity model.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Data has become a key input for driving growth, enabling businesses to differentiate themselves and maintain a competitive edge. For instance, businesses can harness data to make decisions about finding new customers, increasing customer retention, improving customer service, making better marketing decisions, and predicting sales trends, amongst others. Businesses both generate and collect vast amounts of data and often store the data in a storage device (e.g., storage arrays).

Businesses can use a storage device (e.g., a data storage system) that can use a collection of multiple drives to store the vast amounts of data. Because the data is a key input for driving a business's growth, businesses implement data protection techniques to safeguard important data from corruption, compromise, or loss. For example, data can be compromised by malicious agents such as ransomware, rogue employees, hardware failure, and power loss, amongst others.

Businesses often rely on data replication techniques to safeguard important data. Data replication techniques include storing data in more than one location (e.g., a site or node). Specifically, the replication techniques copy data from location to another location by duplicating generated and collected data on an ongoing basis. However, the benefits of data replication are often outweighed by its risks and required operational overhead (e.g. due to the vast amounts of data). Further, businesses are finding that data replication by itself is insufficient to protect data.

Embodiments of the present disclosure relate to continuous data protection techniques that can identify anomalies. The data protection techniques disclosed herein can use one or more machine learning (ML) engines for anomaly detection. In embodiments, the ML engines can include software and/or hardware elements (e.g., circuitry) configured for reinforcement learning. For instance, the embodiments can take constant rolling snapshots of data storage elements. Using the snapshots, the ML engines can model data storage change rate trends. Accordingly, the ML engines can identify events inconsistent with the identified trends. The ML engines can further quarantine a snapshot including an inconsistent event as a potential anomaly. In further embodiments, the data protection techniques can storage of anomalies based on a capacity of memory allocated to store snapshots corresponding to identified anomalies. The embodiments are discussed in greater detail in the following paragraphs.

Figure 1:
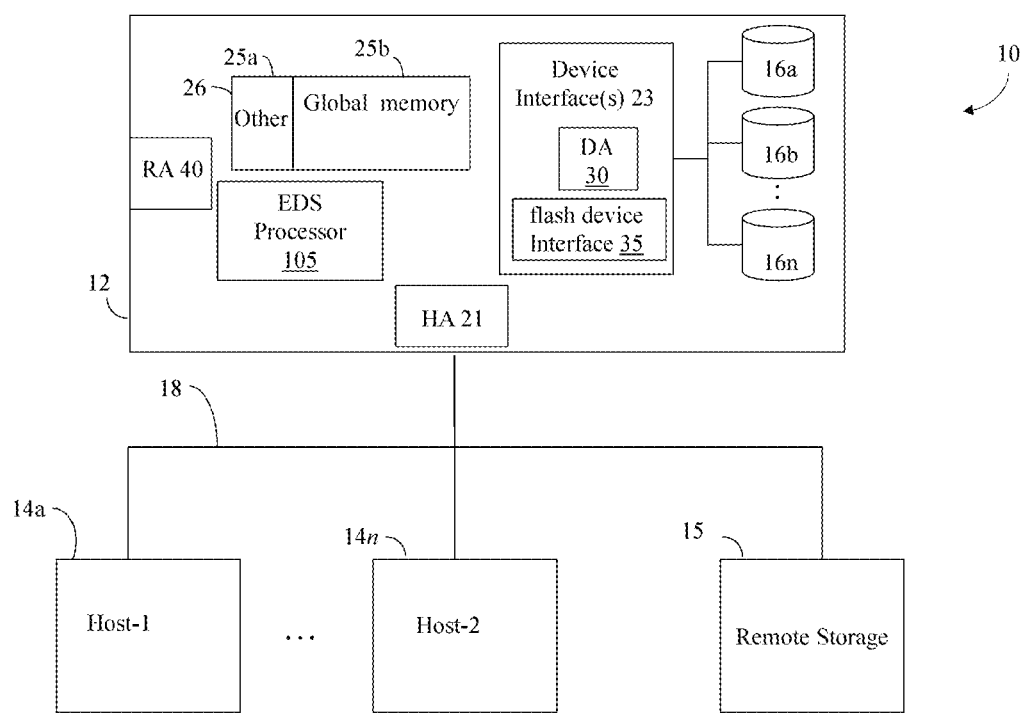
FIG. 1 is a block diagram of a storage system in accordance with example embodiments disclosed herein.

Referring to FIG. 1, an example system 10 includes a data storage device 12. The device 12 is connected to host systems 14a-n and a remote storage 15 through communication medium 18. In embodiments, the hosts 14a-n can access the data storage device 12, for example, to perform input/output (I/O) operations or data requests. In further embodiments, the storage device 12 can access the remote storage to, e.g., offload data as described in greater detail herein. The communication medium 18 can be any one or more of a variety of networks or other type of communication connections as known to those skilled in the art. In embodiments, the communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-n can access and communicate with the data storage device 12 such as. The hosts 14a-n can also communicate with other components included in the system 10 via the communication medium 18. In embodiments, each of the hosts 14a-n can access the storage device 12 via, e.g., a SAN switch (not shown). In embodiments, the SAN switch can be a Fibre Channel (FC) switch employing an FC communication protocol. The FC switch can examine data packet headers of I/O operations or data requests, determine their respective origin and destination, and send the packets to a correct host adapter (HA) 21 of the storage device 12.

Each of the hosts 14a-n and the data storage device 12 can be connected to the communication medium 18 by any one of a variety of connections as may be provided and supported in accordance with the type of communication medium 18. The processors included in the hosts 14a-n and/or storage device 12 may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage device 12 are described herein in more detail and can vary with each embodiment. Each of the hosts 14a-n and data storage device 12 can all be located at the same physical site or can be in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n and data storage device 12 can be connected to the communication medium may pass through other communication devices, such as switching equipment that may exist, e.g., a phone line, a repeater, a multiplexer or even a satellite.

Each of the hosts 14a-n can perform different types of data operations in accordance with different types of tasks. In embodiments, any one of the hosts 14a-n may issue a data request (e.g., including an input/output (I/O) operation) to the data storage device 12 to perform a data operation. For example, an application executing on one of the hosts 14a-n can issue an I/O operation (e.g., a read or write operation) via one or more data requests to the data storage device 12.

It should be noted that although device 12 is illustrated as a single data storage system, such as a single data storage array, device 12 may also represent, for example, multiple data storage arrays alone, or in combination with, other data storage devices, systems, appliances, and/or components having suitable connectivity, such as in a SAN. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass.

However, as will be appreciated by those skilled in the art, the embodiments herein are applicable for use with other data storage arrays by other vendors and with other components than as described herein for purposes of example.

The data storage device 12 can include a plurality of data storage devices 16a-n. The data storage devices 16a-n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory based SSDs are one type of SSD that contains no moving parts. The embodiments described herein can be used in an embodiment in which one or more of the devices 16a-n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-n and the global memory (GM) 25b. In an embodiment, the HA 21 may be a Fibre Channel Adapter (FA) or another adapter which facilitates host communication. The HA 21 may be characterized as a front-end component of the data storage device 12 which receives a request from one or more of the hosts 14a-n. The data storage array 12 can include one or more RAs (e.g., RA 40) that may be used, for example, to facilitate communications between data storage arrays (e.g., between the storage array 12 and the external storage device(s) 105). The data storage array 12 may also include one or more device interfaces 23 for facilitating data transfers to/from the data storage devices 16a-n. The data storage interfaces 23 may include device interface modules, for example, one or more disk adapters (DAs) 30 (e.g., disk controllers), flash drive interface 35, and the like. The DA 30 can be characterized as a backbend component of the data storage device 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system 10 as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-n provide data and access control information through channels to the storage systems 12, and the storage systems 12 may also provide data to the host systems 14a-n also through the channels. The host systems 14a-n do not address the drives or devices 16a-n of the storage systems directly, but rather access to data can be provided to one or more host systems 14a-n from what the host systems view as a plurality of logical devices or logical volumes (LVs). The LVs may or may not correspond to the actual physical devices or drives 16a-n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two or more data storage arrays (e.g., device 12 and external device(s) 105). The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-n. For example, a device interface may be a DA 30 that accomplishes the foregoing by creating job records for the different LVs associated with a device. These different job records may be associated with the different LVs in a data structure stored and managed by each device interface.

The storage device 12 can include an Enginuity Data Service (EDS) processor 105. For example, the EDS processor 105 can monitor and take snapshots of the disks 16a-n of FIG. 1 via, e.g., a Fibre Channel (FC). The snapshots can correspond to storage groups (e.g., logical unit numbers (LUNs)) of the disks 16a-n. The processor 105 can take the snapshots in real-time, e.g., continuously or over periodic intervals or random intervals.

Further, the processor 105 can analyze the snapshots to generate one or more models of data storage change rates over certain time periods. In embodiments, the time periods can be grouped according to business operational calendars. A business operation calendar can correspond to a portion of a day, day of the week, week of a month, month, quarter, and season, amongst others. Using the change rate models, the processor 105 can calculate an average change rate per time period group. The processor 105 can detect potential anomalies by comparing events (e.g., changes) within each snapshot with the average change rate. For example, the processor 105 can flag, as an anomaly, those events having a change rate over a threshold value above and/or below the average change rate. The processor 105 can further quarantine any flagged anomaly to allow mitigating measures to be taken. For example, flagged anomalies can be reported to a storage device technician for further review and/or one or more known data cleansing and/or repair techniques can be implemented.

To quarantine the anomalies, the processor 105 can establish portions of memory for storing the snapshots and detected anomalies as described in greater detail herein. Further, the processor 105 can offload the snapshots and anomalies ("snapshot data") to the remote storage 15 to, e.g., preserve storage device resources (e.g., memory and computing resources). The processor 105 can further offload the snapshot data based on anticipated workloads and anomaly detection predictions. In embodiments, the processor 105 can establish policies for storing the snapshot data in the remote storage 15 in view of one or more recovery point objectives (e.g., acceptable levels of data loss).

As described in greater detail herein, the processor 105 can further establish a data protection policy by analyzing workloads received by the storage device 12. For example, the processor 105 can analyze the workloads to identify and establish transition points for snapshot data transfers (e.g., one or more transfer schedules). The transfer schedules can be based on one or more of storage device performance levels (e.g., response times), bandwidth available for transmitting data to the remote storage 15, data service level priorities, and anomaly detection predictions.

Although the EDS processor 105 is depicted within the device 12, it should be noted that the EDS processor 105 may exist external to the data storage device 12 (as illustrated). Accordingly, the processor 105 can communicate with the data storage device 12 using any one of a variety of communication connections. In one embodiment, the EDS processor 105 may communicate with the data storage device 12 through connections including one or more of a serial port, a parallel port and a network interface card, e.g., with an Ethernet connection. Using the Ethernet connection, for example, the EDS processor 105 may communicate directly with DA 30 and HA 21 within the data storage device 12.

Figure 2:
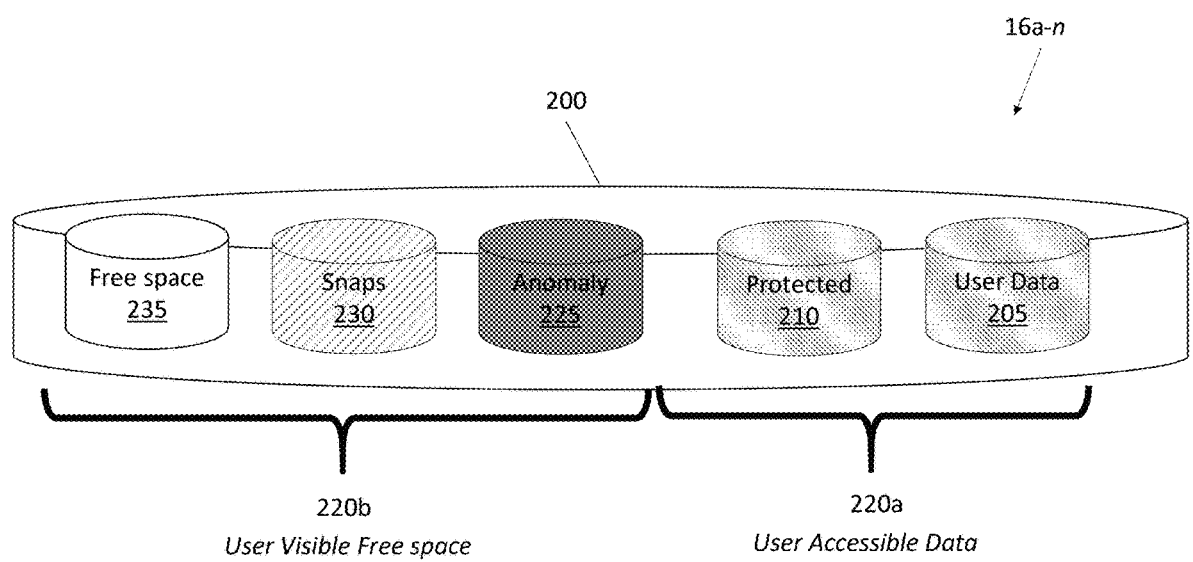
FIG. 2 is a block diagram of storage disk(s) of a storage device in accordance with example embodiments disclosed herein.

Referring to FIG. 2, the EDS processor 105 of FIG. 1 can allocate one or more portions of memory 200 of, e.g., disks 16a-n for storing data related to autonomous data protection services. In embodiments, the processor 105 can allocate a first memory portion 220a for host I/O operations (e.g., user/host 14a-n access). Further, the processor 105 can allocate a second memory portion 220b storing data collected, generated, or used by the processor 105 to perform autonomous data protection services.

In embodiments, the EDS processor 105 can configure the second memory portion 220b to be visible as free space to, e.g., hosts 14a-n of FIG. 1. Accordingly, the EDS processor 105 can provide autonomous data protection services in a manner that is both seamless and does not impact storage resources from a host user's perspective. In further embodiments, the EDS processor 105 can subdivide the second memory portion 220b into sub-portions 225, 230, 234. Further, the EDS processor 105 can configure each sub-portion 225, 230, 234 to store specific types of data. In the non-limiting example shown by FIG. 2, the EDS processor 105 can subdivide the second memory portion 220b into an anomaly sub-portion 225, snaps sub-portion 230, and free space sub-portion. The anomaly sub-portion 225 can be configured to store anomaly data; the snaps sub-portion 230 can be configured to store captured snapshots of the storage device 12 and its disks 16a-n; and the free space sub-portion 235 can be configured to dynamically provide additional storage resources to either or both of the memory portions 220a-b as discussed in greater detail herein.

Figure 3:
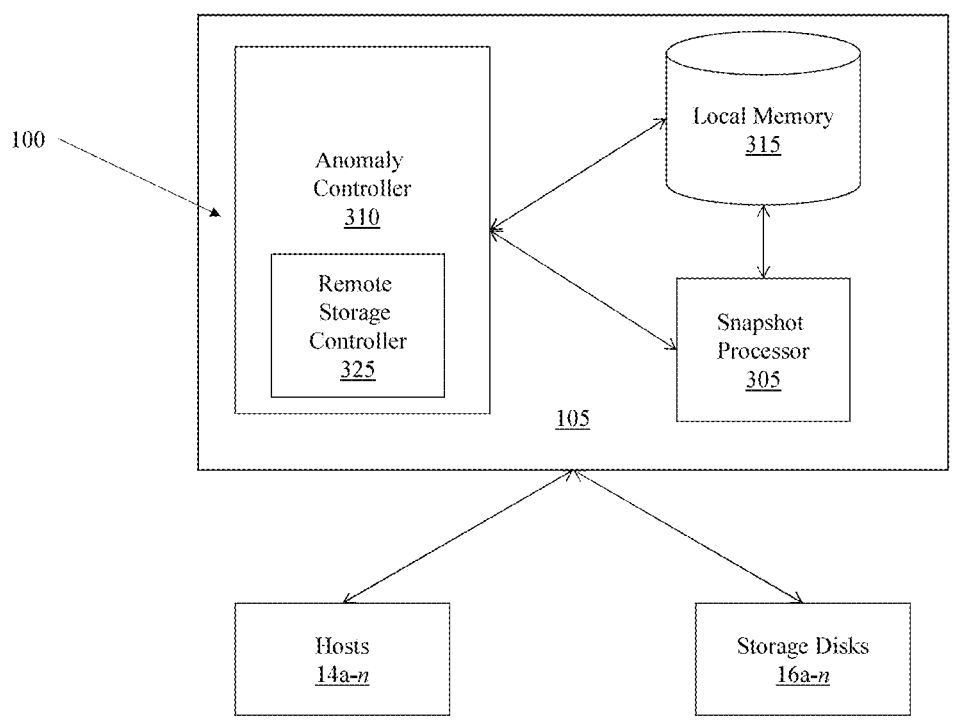
FIG. 3 is a block diagram of an Enginuity Data Service (EDS) processor in accordance with example embodiments disclosed herein.

Referring to FIG. 3, the EDS processor 105 can include elements 100 (e.g., software and hardware elements). In embodiments, the EDS processor 105 can be any one of a variety of commercially available processors, such as an Intel-based processor, and the like. In other embodiments, the EDS processor 105 can be a parallel processor such as a graphical processing unit (GPU). Although what is described herein shows the elements 100 residing in the EDS processor 105, all or portions of the illustrated elements 100 can reside elsewhere such as in a storage device component, e.g., HA 21, or any of the host systems 14a-n of FIG. 1.

In embodiments, the EDS processor 105 can include a snapshot processor 305 communicatively coupled to storage disks 16a-n. The snapshot processor 305 can collect data from the storage disk 16a-n and storage device 12 components via, e.g., a Fibre channel (FC). The components can include elements such as components 21-23, 25a-b, 26, 30, 35, and 40 of device 12 depicted in FIG. 1, amongst other known components. In embodiments, the storage devices 12 can include one or more daemons communicatively coupled to and configured to monitor each storage device component. For example, the daemons can generate log files that record activities of each storage device and their respective components. Accordingly, the snapshot processor 305 can collect the data via one or more communication push and/or pull techniques to retrieve the log files generated by each daemon.

The snapshot processor 305 can obtain one or more snapshots of, e.g., the disks 16a-n by accessing the disks 16a-n directly or indirectly using one or more disk daemons (not shown). The snapshot processor 305 can take snapshots of each disk's storage groups (e.g., logical unit numbers (LUNs). In embodiments, the snapshot processor 305 can take snapshots in real-time, e.g., continuously or over periodic or random time intervals. The snapshot processor 305 can store the snapshots in a local memory 315 and/or the snaps sub-portion 230 of FIG. 2. In other embodiments, the snapshot processor 305 can segment the snapshots into the time intervals using, e.g., time stamps included in each snapshot. For example, the snapshot processor 305 can be configured to group the snapshots into predetermined time period groups as defined above.

In additional embodiments, each daemon can be configured to conduct time series measurements to generate log files that group storage device and/or storage device component data into sample time intervals. For example, a sample time interval can be five (5) minutes, and each daemon can conduct activity measurements during each interval to generate time interval log files. The snapshot processor 305 can associate each time interval log file with one or more snapshots.

Further, the snapshot processor 305 can analyze the snapshots captured during each time interval. The analysis can include determining change rates of a total number of modified (e.g., changed) tracks per LUN of each snapshots. Using the change rates, the snapshot processor 305 can generate one or more change rate models over certain time period groups. In embodiments, the snapshot processor 305 can generate the models using a ML engine. The ML engine can perform one or more local regression and/or local polynomial regression techniques such as a locally estimated scatterplot smoothing (LOESS) technique on the snapshots to generate each model. For example, the ML engine can identify trends (e.g., seasonal trends or business calendar-based trends) to group and generate models in certain time period groups. For example, the snapshot processor 305 can group time intervals into time period groups according to business calendars grouped by, e.g., a portion of a day, day of the week, week of a month, month, quarter, and season, amongst others.

Using the change rate models, the snapshot processor 305 can calculate an average change rate per time period group. By comparing events (e.g., changes) within each snapshot to the average change rate per time period group, the snapshot processor 305 can detect potential anomalies. Each flag can, e.g., include a unique anomaly identifier (ID). Further, each unique anomaly ID can define a particular anomaly type. In embodiments, anomaly types can be based on the time period group and a magnitude of an anomaly's change rate relative to the threshold change rate.

In embodiments, the snapshot processor 305 can flag an event as an anomaly if its change rate is greater than a threshold change rate. The threshold change rate can be a delta value that is greater than or less than the average change rate. In further embodiments, the snapshot processor 305 can dynamically adjust the threshold change rate using one or more machine learning (ML) techniques such as a reinforcement learning technique as described in greater detail herein.

The snapshot processor 305 can further quarantine any flagged anomaly to allow an anomaly controller 310 to implement one or more anomaly mitigating measures as discussed herein. In embodiments, the anomaly controller 310 can identify one or more anomaly mitigation policies using the unique anomaly IDs. For example, a searchable data structure stored in the local memory 315 can associate each unique anomaly ID with one or more anomaly mitigation policies. In other examples, the controller can report flagged anomalies to a storage device technician for further review and performance of one or more mitigation actions. The snapshot processor 305 can monitor the mitigation actions taken by the technician in response to each reported anomaly. Using one or more ML techniques, the snapshot processor 305 can identify patterns of taken mitigation actions. Further, the snapshot processor 305 can generate one or more anomaly mitigation policies based on the identified patterns. In embodiments, the snapshot processor 305 can generate the one or more anomaly mitigation policies for each anomaly type using each unique anomaly ID.

In embodiments, a technician may not have time and/or sufficient data to perform a mitigation action in response to receiving a reported anomaly. Accordingly, the technician can mark the anomaly event as protected for further review and analysis. In response to such a marking, the snapshot processor 305 can store the protected anomaly in protected sub-portion 210 of FIG. 2, which is configured to prevent data it stores from either being deleted or transferred to, e.g., the remote storage 15 of FIG. 1. In examples, data stored by the sub-portion 210 is automatically moved or deleted according to one or more data policies in response to, e.g., the technician changing or removing the protected marking.

In some circumstances, the storage device 12 can receive workloads that require storage allocated for the second memory portion 220b of FIG. 2. Accordingly, the controller 310 can dynamically re-allocate memory to the first memory portion 220b from the second memory portion 220b for storing workload related data.

In embodiments, the controller 310 can transfer or delete snapshots from one or more of the sub-portions 225, 230, 235 based on a policy and/or dynamically in response to workload conditions.

For example, the controller 310 can transfer or delete snapshots from any of the sub-portions 225, 230, 235 based each snapshots creation time. In embodiments, the controller 310 can transfer or delete snapshots from the snaps sub-portion 230 in response to reaching or exceeding a threshold age. Further, the controller 310 can transfer or delete anomalies from the anomaly sub-portion 225 in response to reaching or exceeding a threshold anomaly age. In other examples, the controller 310 can transfer or delete anomalies reaching or exceeding the threshold anomaly age only upon the anomaly sub-portion 225 reaching a threshold capacity.

The controller 310 can define each of the aforementioned based on a preconfigured setting and/or a dynamically set threshold. In embodiments, the controller 310 can dynamically set each threshold using a ML engine. The ML engine can be configured to apply one or more ML techniques on workload behavioral data collected by the snapshot processor 305. Using the ML techniques, the ML engine can generate workload models. The models can define (e.g., predict) memory settings during anticipated workloads. Accordingly, the controller 310 can use the workload models to transfer snapshots, delete snapshots, and/or adjust memory allocations to ensure sufficient storage is allocated or available to be allocated to the first portion 220a.

In embodiments, the controller 310 can include a remote storage controller 325 configured to trigger a transfer of snapshots to the remote storage 15 of FIG. 1. The storage controller 325 can transfer snapshots based on one or more data protection policies established using, e.g., the workload models. In embodiments, the data protection policies can supersede a data deletion policy or thread.

Figure 5:
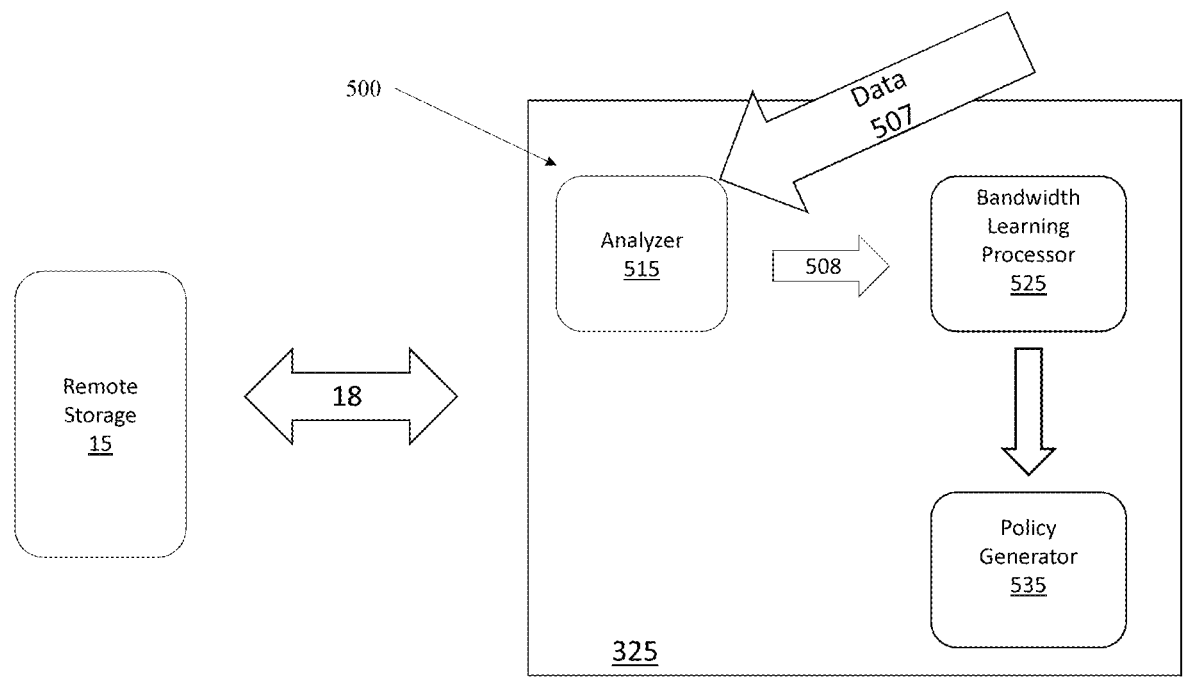
FIG. 5 is a block diagram of a remote storage controller in accordance with example embodiments disclosed herein.

In an example, the storage controller 325 can analyze the workload models to generate one or more data transfer models using a learning processor (e.g., processor 525 of FIG. 5). The predictive data transfer models can include predictive anomaly snapshot information. The information can identify predicted I/O type, frequency, patterns, service level requirements (e.g., performance requirements), associated I/O operations within each anomaly snapshot. The information can further identify predicted storage device resources and performance levels, amongst other data relevant for data protection policies. The remote storage controller 325 is described in greater detail with respect to FIG. 5 below.

Figure 4:
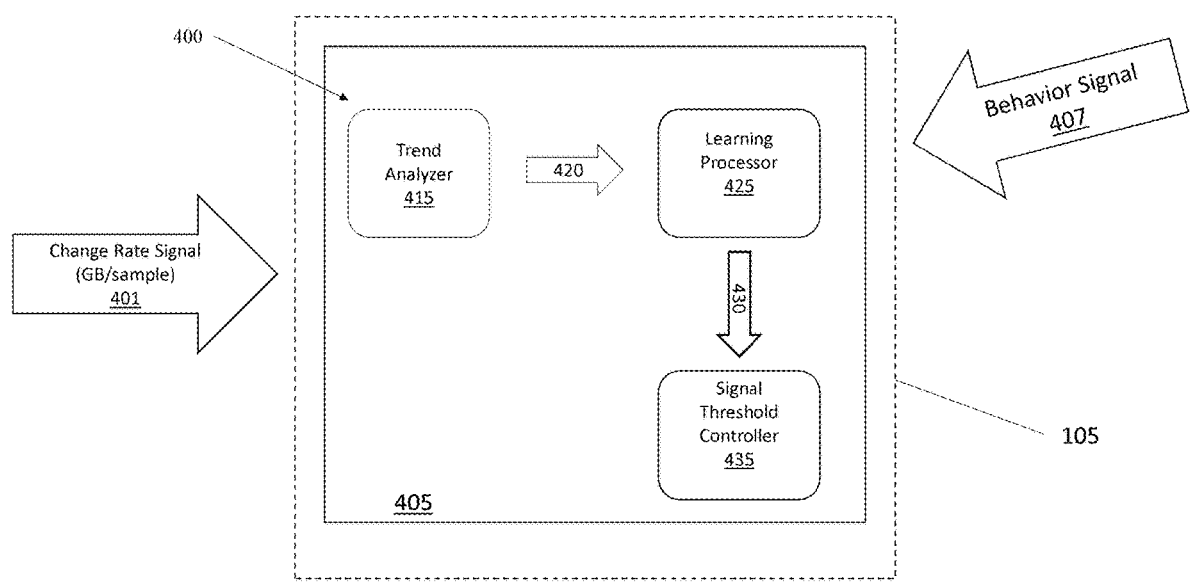
FIG. 4 is a block diagram of a machine learning (ML) engine in accordance with example embodiments disclosed herein.

Referring to FIG. 4, the EDS processor 105 can include a machine learning (ML) engine 405 configured to dynamically adjust the threshold change value, as defined herein, to identify anomalous snapshots. The ML engine 405 can include elements 400 (e.g., software and hardware elements). In embodiments, the ML engine can be any one of a variety of commercially available processors, such as an Intel-based processor, and the like. Although what is described herein shows the elements 400 residing in the ML engine 405, all or portions of the illustrated elements 400 can reside elsewhere such as in the snapshot processor 305 and/or the controller 310 of FIG. 3.

The ML engine 405 can include a trend analyzer 415 that receives a change rate signal 401. The signal 401 can be received as snapshots from one or more daemons as described herein. The trend analyzer 415 can be configured to perform one or more local regression and/or local polynomial regression techniques such as a locally estimated scatterplot smoothing (LOESS) technique on the snapshots to generate change rate models as described herein. The analyzer 415 can issue a signal 420 including the change rate models to a learning processor 425. Additionally, the learning processor 425 can receive a behavior signal 407 that includes data associated with any mitigation actions taken on flagged anomalous snapshots. For example, the signal 407 can include information identifying whether a technician marked an anomaly as protected. The learning processor 425 can perform a reinforcement learning technique using the data received from the signals 407, 425 to dynamically generate a threshold change rate value. Using the generated change rate value received via threshold signal 430, a signal threshold controller 435 can adjust threshold change rate settings of the snapshot processor 305 of FIG. 3.

In embodiments, the controller 435 can either increase or lower a current threshold change rate value setting of the snapshot processor 305. For example, the controller 435 increases the threshold change rate value if data from the signal 407 indicates that the anomaly controller 310 of FIG. 3 has transferred or deleted one or more anomalies from the anomaly sub-portion 225 of FIG. 2. In other examples, the controller 435 decreases the threshold change rate value if data from the signal 407 indicates that the anomaly controller 310 has moved one or more anomalies to the protected sub-portion 210 of FIG. 2. Accordingly, the controller 435 increases the threshold change rate value to expand anomaly detection to ensure a current threshold setting is not too low. Alternatively, the controller 435 decreases the threshold change rate value to lower anomaly detection to decrease the detection of false positive anomalies by the snapshot processor 305.

Referring to FIG. 5, a remote storage controller 325 can include logic and/or circuitry 500 configured to transfer (i.e., offload) anomalies and/or anomaly snapshots to a remote storage 15. In embodiments, the storage controller 325 can include an analyzer 515 that can receive or obtain data 507 (e.g., workload models and other IO related data) from the ML engine 405 of FIG. 4. The analyzer 515 can also monitor bandwidth capacities for transmitting/receiving data to/from the remote storage 15 over the communication medium 18. In embodiments, the analyzer 515 can monitor data transfer throughput levels to the remote storage to identify a ceiling throughput level (e.g., a saturation point). For example, the analyzer 515 can identify changes in throughput to detect how close a communication medium (e.g., network) is to saturation. Based on the analysis, the analyzer 515 can generate a signal 508 defining total bandwidth capacity (e.g., throughput) and available throughput for offloading snapshots to the remote storage 15. In embodiments, the analyzer 515 can bin or group ranges of throughput measurements. For example, the groups or bins can correspond to a time period (e.g., day of week), transfer time (e.g., in microseconds (us)), transfer rate (e.g., mb/s).

Using the signal 508, the controller 325 can, using a bandwidth learning processor 525, generate predictions of available throughput for transferring anomaly snapshots to the remote storage 15. For example, the processor 525 can perform one or more ML techniques (e.g., a reinforcement learning techniques) using signal data 507 to generate the throughput predictions. The processor 525 can generate the throughput predictions can be based on historical throughput data. The throughput predictions can be defined by one or more throughput models created by the processor 525. Each model can bin or group the throughput predictions. For example, the groups or bins can correspond to a time period (e.g., day of week), transfer time (e.g., in microseconds (us)), transfer rate (e.g., mb/s).

The controller 325 can further include a policy generator 535 to generate one or more data transfer policies for offloading anomaly snapshots to the remote storage using the throughput predictions. In examples, the policy generator can correlate the throughput predictions with one or more of anticipated workloads, predicted performance levels (e.g., response times) of the storage device 15, predicted amounts of anomaly snapshots, predicted service level priorities associated with each predicted anomaly snapshot, capacity of memory allocated to store the anomalies on the storage device 12, rate at which anomaly snapshots are created, and estimated time to transfer predicted anomalous snapshots to the remote storage 15.

Using the correlation, the generator 535 can identify transition points within or between workloads for transferring anomalous snapshots to the remote storage 15. The generator 535 can further define an amount of predicted throughput available for transferring anomalous snapshots during each transition point. In embodiments, the controller 325 can establish one or more bandwidth consumption ceilings for offloading anomalous snapshots. In examples, the controller 325 can establish a ceiling for each service level tier corresponding to each anomalous snapshot. Each service level tier can define expected metrics for processing and storing data corresponding to anomalous snapshots (e.g., I/O operations and corresponding data within each snapshot). Service level tiers can further be defined by a service level agreement between a storage device client and storage provider. As such, the generator 535 can establish data protection policies biasing a balance of resources based on service level priorities.

The following text includes details of one or more methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 6:
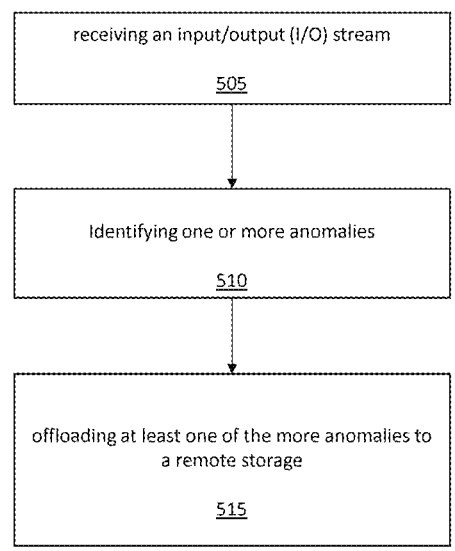
FIG. 6 is a flow diagram of a method for autonomous data protection in accordance with example embodiments disclosed herein.

Referring to FIG. 6, a method 600 can be executed by, e.g., an EDS processor (e.g., the EDS processor 105 of FIGS. 1-2) and/or any element of device 12 of FIG. 1. The method 600 describes steps for autonomous data protection. At 605, the method 600 can include receiving an input/output (I/O) stream directed to a storage device. The method 600, at 610, can also identifying one or more anomalies corresponding to the IO stream. At 615, the method 600 can further include offloading at least one of the anomalies to a remote storage based on a capacity of memory allocated to store at least one snapshot of the storage device that include at least one of the one or more anomalies. In embodiments, the method 600, at 515, can offload one or more anomalies in response to the memory reaching a threshold capacity level. It should be noted that each step of the method 600 can include any combination of techniques implemented by the embodiments described herein. Further, the method 600 and any of its steps can be performed using any technique described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a backend component. The backbend component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   receive an input/output (IO) stream for a storage device;
   identify one or more events having a change rate greater than a threshold and corresponding to the IO stream; and
   offload at least one of the one or more events to a remote storage based on a capacity of memory allocated to store at least one snapshot of the storage device that include at least one of the one or more events.

2. The apparatus of claim 1 further configured to:
   obtain the one or more snapshots of the storage device or at least one component of the storage device based on one or more of a predetermined snapshot rate and a dynamically determined snapshot rate; and
   identify the one or more events based on a change rate corresponding to the memory allocated to store data contained in one or more IO operations of the IO stream, wherein the change rate corresponds to changed tracks of each logical unit number (LUN) of the memory.

3. The apparatus of claim 1 further configured to offload the one or more events based on at least one or more of a bandwidth to the remote storage, storage device performance state, service level priorities, and predictions of one or more events being identified during a future time period.

4. The apparatus of claim 1 further configured to measure a bandwidth to the remote storage and/or a storage device performance state.

5. The apparatus of claim 1 further configured to identify a service level (SL) tier of a service level agreement (SLA) corresponding to data contained in one or more IO operations of the IO stream, wherein each SL tier of the SLA defines one or more performance requirements for storing the data.

6. The apparatus of claim 4 further configured to monitor throughput to the remote storage to measure a bandwidth capacity for sending data to the remote storage.

7. The apparatus of claim 6 further configured to allocate a portion of the bandwidth capacity for offloading the one or more events.

8. The apparatus of claim 7 further configured to dynamically assign at least one of a bandwidth consumption ceiling and/or bandwidth consumption floor to each SL tier based on the allocated bandwidth portion.

9. The apparatus of claim 8 further configured to:
   generate an anomaly detection model based on confirmed anomaly data, using an anomaly detection learning engine; and
   generate a bandwidth capacity model for offloading the one or more events based on measured bandwidth capacities over time.

10. The apparatus of claim 9 further configured to offload the one or more events based on one or more of the anomaly detection model and the bandwidth capacity model.

11. A method comprising:
    receiving an input/output (IO) stream for a storage device;
    identifying one or more events having a change rate greater than a threshold and corresponding to the IO stream; and
    offloading at least one of the one or more events to a remote storage based on a capacity of memory allocated to store at least one snapshot of the storage device that include at least one of the one or more events.

12. The method of claim 11 further comprising:
    obtaining the one or more snapshots of the storage device or at least one component of the storage device based on one or more of a predetermined snapshot rate and a dynamically determined snapshot rate; and
    identifying the one or more events based on a change rate corresponding to the memory allocated to store data contained in one or more IO operations of the IO stream, wherein the change rate corresponds to changed tracks of each logical unit number (LUN) of the memory.

13. The method of claim 11 further comprising offloading the one or more events based on at least one or more of a bandwidth to the remote storage, storage device performance state, service level priorities, and predictions of one or more events being identified during a future time period.

14. The method of claim 11 further comprising measuring a bandwidth to the remote storage and/or a storage device performance state.

15. The method of claim 11 further comprising identifying a service level (SL) tier of a service level agreement (SLA) corresponding to data contained in one or more IO operations of the IO stream, wherein each SL tier of the SLA defines one or more performance requirements for storing the data.

16. The method of claim 14 further comprising monitoring throughput to the remote storage to measure a bandwidth capacity for sending data to the remote storage.

17. The method of claim 16 further comprising allocating a portion of the bandwidth capacity for offloading the one or more events.

18. The method of claim 17 further comprising dynamically assigning at least one of a bandwidth consumption ceiling and/or bandwidth consumption floor to each SL tier based on the allocated bandwidth portion.

19. The method of claim 18 further comprising:
generating an anomaly detection model based on confirmed anomaly data using an anomaly detection learning engine; and
generating a bandwidth capacity model for offloading the one or more events based on the measured bandwidth capacities over time.

20. The method of claim 19 further comprising offloading the one or more events based on one or more of the anomaly detection model and the bandwidth capacity model.

* * * * *